US008005564B2

(12) United States Patent
Sato

(10) Patent No.: US 8,005,564 B2
(45) Date of Patent: Aug. 23, 2011

(54) ROLL PAPER PRINTING APPARATUS

(75) Inventor: Hajime Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/046,634

(22) Filed: Mar. 11, 2011

(65) Prior Publication Data

US 2011/0157650 A1 Jun. 30, 2011

Related U.S. Application Data

(63) Continuation of application No. 12/263,333, filed on Oct. 31, 2008, now Pat. No. 7,930,055.

(30) Foreign Application Priority Data

Nov. 1, 2007 (JP) ................................ 2007-285573

(51) Int. Cl.

| | |
|---|---|
| ***G06F 19/00*** | (2011.01) |
| ***B41F 13/56*** | (2006.01) |
| ***H04N 1/00*** | (2006.01) |
| ***G06K 15/00*** | (2006.01) |

(52) U.S. Cl. ......... 700/122; 101/226; 358/1.6; 358/1.14

(58) Field of Classification Search .................... 700/90, 700/95, 117, 122; 101/219, 226, 417; 358/1.6, 358/1.14; 400/578, 582, 605

See application file for complete search history.

(56) References Cited

U.S. PATENT DOCUMENTS

| | | | | |
|---|---|---|---|---|
| 4,936,695 | A * | 6/1990 | Ishii | 400/605 |
| 5,121,867 | A * | 6/1992 | Aoyama et al. | 226/101 |
| 5,746,525 | A * | 5/1998 | Sanda et al. | 400/605 |
| 6,860,662 | B2 * | 3/2005 | Iwamura | 400/582 |
| 2006/0224463 | A1 * | 10/2006 | Kubo et al. | 705/26 |
| 2007/0171454 | A1 * | 7/2007 | Takahashi et al. | 358/1.14 |
| 2008/0174793 | A1 * | 7/2008 | Mutsuno | 358/1.6 |

FOREIGN PATENT DOCUMENTS

JP 2006088364 A * 4/2006

* cited by examiner

*Primary Examiner* — Crystal J Barnes-Bullock

(74) *Attorney, Agent, or Firm* — Canon USA Inc IP Division

(57) ABSTRACT

A roll paper printing apparatus includes a transmission source identification unit to identify a transmission source of print data received from a host interface unit, a transmission source information storage unit to store the transmission source information identified by the transmission source identification unit, a transmission source information comparison unit to compare transmission source information of a preceding print job with transmission source information of a print job which is to be printed next, an uncut printed output identification unit to identify an uncut printed output, and an interrupt printing prohibition unit to prohibit printing of the print job which is to be printed next as interrupt printing if the transmission source information of the preceding print job and the transmission source information of the print job which is to be printed next are different when the uncut printed output is identified by the uncut printed output identification unit.

7 Claims, 7 Drawing Sheets

ROLL PAPER PRINTING APPARATUS

CROSS-REFERENCE TO RELATED APPLICATIONS

This application is a continuation of U.S. patent application Ser. No. 12/263,333, now U.S. Pat. No. 7,930,055, filed Oct. 31, 2008, which claims priority from Japanese Patent Application No. 2007-285573 filed Nov. 1, 2007, all of which are hereby incorporated by reference herein in their entirety.

BACKGROUND OF THE INVENTION

1. Field of the Invention

The present invention relates to a printing apparatus connected to a host which prints on roll paper and which is equipped with a roll paper cutting unit.

2. Description of the Related Art

Among conventional printing apparatuses which are connected to a host, a roll paper printing apparatus which prints on roll paper typically cut the roll paper with a roll paper cutting unit after the printing and obtains printed matter.

FIG. 5 is a diagram illustrating a conventional roll paper printing apparatus 200.

In the conventional roll paper printing apparatus 200, first, roll paper conveyance units 31 convey a roll paper RP1 to a print head H1 in the direction illustrated by large arrows. Ink is supplied to the print head H1 from an ink tank 61. While being moved by a print head conveyance unit 62, the print head H1 prints by discharging ink on the roll paper RP1.

After printing is completed, a cutter C1 which is a roll paper cutting unit is driven by a cutter conveyance unit 63 to cut the printed roll paper RP1, and desired printed matter is output.

Further, a roll paper cutting instruction determination unit (not illustrated) is provided in the conventional roll paper printing apparatus 200. Depending on contents of the roll paper cutting instruction included in print job data, a printing operation may be finished without cutting the printed roll paper with the cutter C1. The printing operation which is finished without performing cutting with the cutter C1 will hereinafter be referred to as "no-cut printing".

FIG. 6 is a diagram illustrating one sheet of consecutive print results 71 in a conventional example.

According to the above-described method, as illustrated in FIG. 6, one sheet of consecutive print results 71 is obtained by consecutively transmitting a plurality of pieces of no-cut print job data from the host. Hereinafter, "one sheet of consecutive print results" will be referred to as "banner printing".

In the example illustrated in FIG. 6, the plurality of pieces of no-cut print job data is configured from individual no-cut print jobs A, B, and C demarcated by lines 72. These pieces of job data are consecutively transmitted to the roll paper printing apparatus 200 to form the print results.

When a banner printing method is used and the no-cut print job data are consecutively received, an interrupt print job from another host may be transmitted during the banner printing.

In such a case, interrupt printing is performed with other print job data in the midst of the consecutive printed matter, so that a user cannot obtain intended banner print results. To solve this problem, Japanese Patent Application Laid-Open No. 2006-88364 discusses a roll paper printing apparatus which does not perform interrupt printing when the interrupt printing is requested if a no-cut print job is present in the roll paper printing apparatus.

In the roll paper printing apparatus 200 discussed in Japanese Patent Application Laid-Open No. 2006-88364, when an interrupt print job is received in a state where the no-cut print job is present, the interrupt print job is registered at an end of a queue of already-received print jobs.

FIGS. 7A to 7D are diagrams illustrating job receiving orders transmitted from a plurality of hosts X and Y and interrupt job print results of the conventional roll paper printing apparatus 200.

As illustrated in FIG. 7A, when a plurality of no-cut print jobs A, B, and C are consecutively transmitted from the host X and one print result is to be obtained, a desired print result can be obtained, as shown in a print result column of FIG. 7C.

However, as illustrated in FIG. 7B, when the plurality of no-cut print job data is consecutively transmitted, depending on host performance and the like, a transmission interval may open up between the print jobs. In such a case, as illustrated in FIG. 7B, if an interrupt print job Z is received from the host Y midway through the transmission interval of the no-cut print jobs A, B, and C transmitted from the host X, the interrupt print job Z is printed between the consecutive print jobs A and B. As a result, as shown in a print result column of FIG. 7D, there is the problem that a desired banner print result cannot be obtained.

SUMMARY OF THE INVENTION

The present invention is directed to a roll paper printing apparatus which can correctly obtain one sheet of consecutive print results in interrupt printing even if a transmission interval between a plurality of no-cut print jobs is widened.

According to an aspect of the present invention, a roll paper printing apparatus includes a host interface unit, a roll paper printing unit, a roll paper cutting unit, a roll paper cutting instruction determination unit configured to control the roll paper cutting unit based on roll paper cutting instruction included in print data received from the host interface unit, a transmission source identification unit configured to identify a transmission source of the print data received from the host interface unit, a transmission source information storage unit configured to store transmission source information identified by the transmission source identification unit, a transmission source information comparison unit configured to compare transmission source information of a preceding print job stored in the transmission source information storage unit with transmission source information of a print job which is to be printed next, an uncut printed output identification unit configured to identify an uncut printed output, and an interrupt printing prohibition unit configured to prohibit printing of the print job which is to be printed next as interrupt printing if the transmission source information of the preceding print job and the transmission source information of the print job which is to be printed next are different as a result of the comparison by the transmission source information comparison unit when the uncut printed output is identified by the uncut printed output identification unit.

According to exemplary embodiments of the present invention, when no-cut printed matter is identified in the interrupt printing, the roll paper printing apparatus is prohibited from performing the interrupt printing except for that of the host which transmitted the no-cut print job. Therefore, the roll paper printing apparatus can correctly obtain one sheet of consecutive print results even if the transmission interval between the plurality of no-cut print jobs is widened.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

First Exemplary Embodiment

Figure 1:
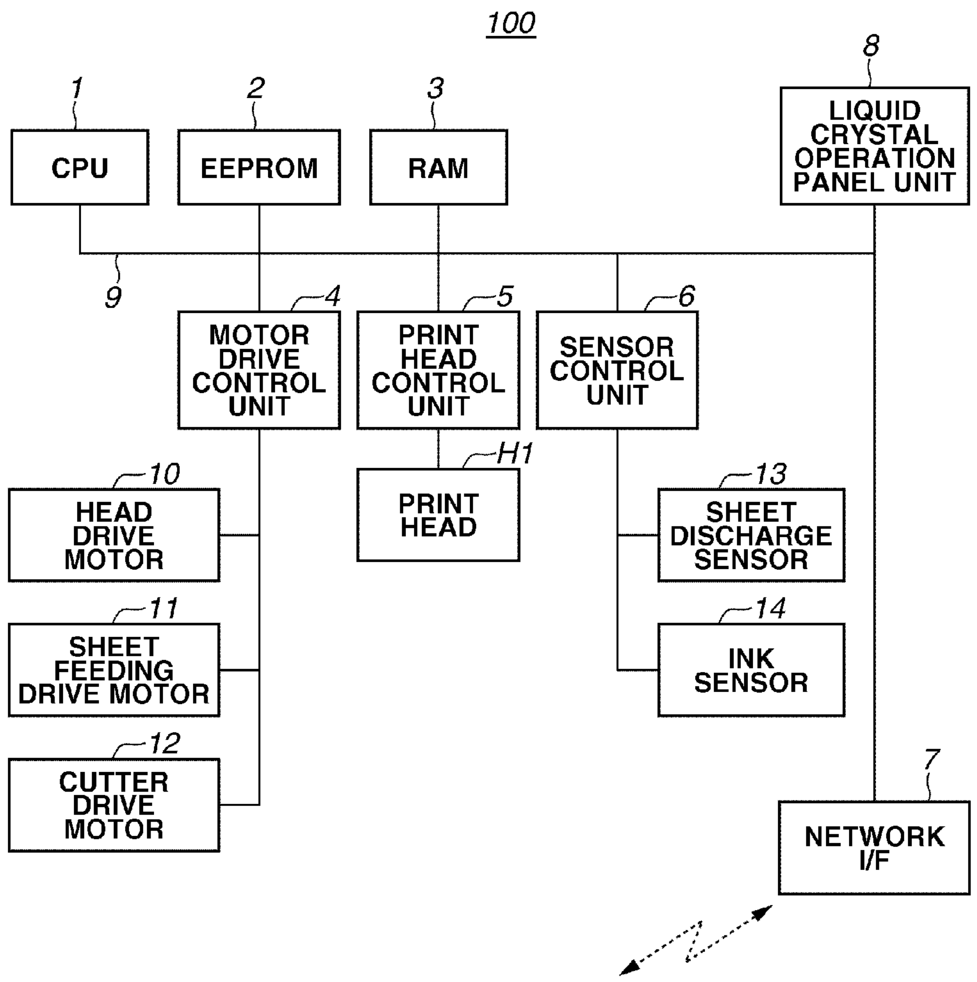
FIG. 1 is a block diagram illustrating a configuration of a roll paper printing apparatus according to an exemplary embodiment of the present invention.

FIG. 1 is a block diagram illustrating a roll paper printing apparatus 100 according to a first exemplary embodiment of the present invention.

The roll paper printing apparatus 100 includes a central processing unit (CPU) 1, an electrically erasable and programmable read-only memory (EEPROM) 2, a random access memory (RAM) 3, a motor drive control unit 4, a print head control unit 5, a sensor control unit 6, and a network I/F 7. Further, the roll paper printing apparatus 100 includes a liquid crystal operation panel unit 8, a bus 9, a head drive motor 10, a sheet feeding drive motor 11, a cutter drive motor 12, a sheet discharge sensor 13, an ink sensor 14, and a print head H1.

The CPU 1 is responsible for operation control over each unit included in the roll paper printing apparatus 100. The EEPROM 2 stores programs for operation processing etc. of the roll paper printing apparatus 100, and a value for setting a state of the roll paper printing apparatus 100.

The RAM 3 temporarily saves print job data, transmission source information etc. of the roll paper printing apparatus 100, and performs writing and reading thereof. The motor drive control unit 4 controls the head drive motor 10 which drives the print head H1, the sheet feeding drive motor 11 which feeds a sheet of paper, and the cutter drive motor 12. The print head control unit 5 provides an instruction for ink discharge operation to the print head H1 which discharges ink onto the sheet of paper.

The sensor control unit 6 controls the sheet discharge sensor 13, and the ink sensor 14 which detects a remaining amount of ink to be discharged from the print head H1. The network I/F 7 is connected to a network, and receives print data transmitted from a host (not illustrated). Instead of the network I/F 7, a unit which can identify the host which transmits the print data may also be used.

The liquid crystal operation panel unit 8 includes a message display unit which displays a message character string to display to a user a name, state, and operation instruction to the roll paper printing apparatus 100, and an operation input unit on which the user inputs instructions by key input. The units 1 to 8 send and receive data among each other via the bus 9.

Next, a data format of the print data transmitted by the network I/F 7, roll paper cutting instruction information, and the transmission source information in the roll paper printing apparatus 100 will be described.

Figure 2:
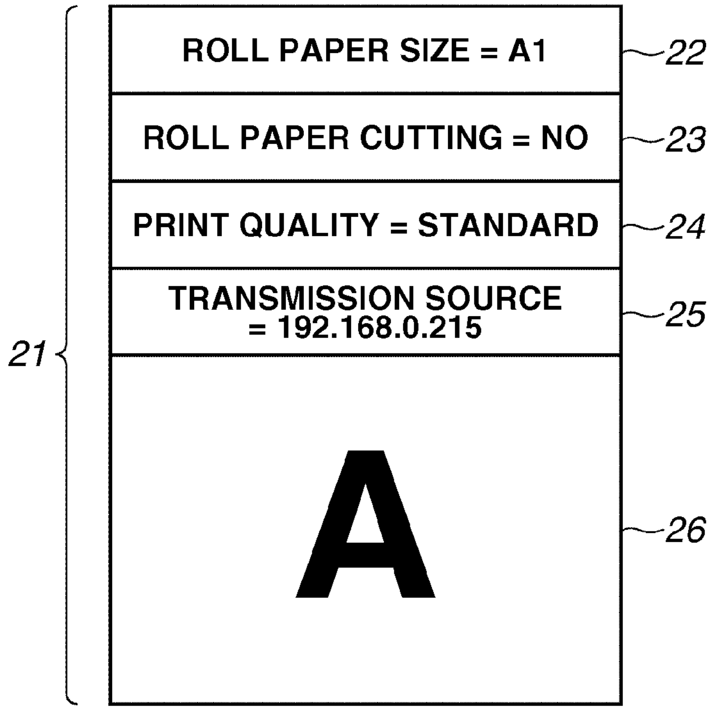
FIG. 2 is a diagram illustrating a data format of print data transmitted by a network interface (I/F), roll paper cutting instruction information, and transmission source information.

FIG. 2 is a diagram illustrating the data format of the print data transmitted by the network I/F 7, the roll paper cutting instruction, and the transmission source information.

Print data 21 is a combination of various pieces of information including roll paper size information 22, roll paper cutting instruction 23, print quality information 24, transmission source information 25, and image data 26. The print data 21 is transmitted from the host (not illustrated) to the roll paper printing apparatus 100. Since the present exemplary embodiment describes a technique for preventing an interruption from another host between jobs during banner printing, the image data 26 transmitted from the host to the roll paper printing apparatus 100 will be described using an example in which the image data has one page per job. However, the image data 26 may have a plurality of pages in one job. More specifically, the image data 26 may be the data which is made by combining images of a plurality of pages produced by an application software program on the host, or may be an image of a plurality of pages produced by a page description language and the like. When there is a plurality of pages in one job, the roll paper printing apparatus 100 does not allow a page from another job to interrupt printing of the plurality of pages.

A roll paper size used by the print data 21 is set in the roll paper size information 22. Whether to cut the printed matter which is printed based on the print data 21 with a cutter C1 is set in the roll paper cutting instruction 23.

Whether to print the printed matter which is printed based on the print data 21 at fast/standard/fine print quality is set in the print quality information 24. An Internet protocol (IP) address for identifying the host which transmitted the print data 21 is set in the transmission source information 25.

Data representation of the image which constitutes the printed matter to be printed based on the print data 21 is set in the image data 26.

Further, the IP address which is the transmission source information 25 is also temporarily stored in the RAM 3. Here, while the IP address is used as the transmission source information 25, as long as the information can uniquely identify the transmission source, other information such as a media access control (MAC) address or a serial number may also be used as the transmission source information 25.

Next, the sheet discharge sensor 13 which identifies an uncut printed output in the roll paper printing apparatus 100 will be described.

Figure 3:
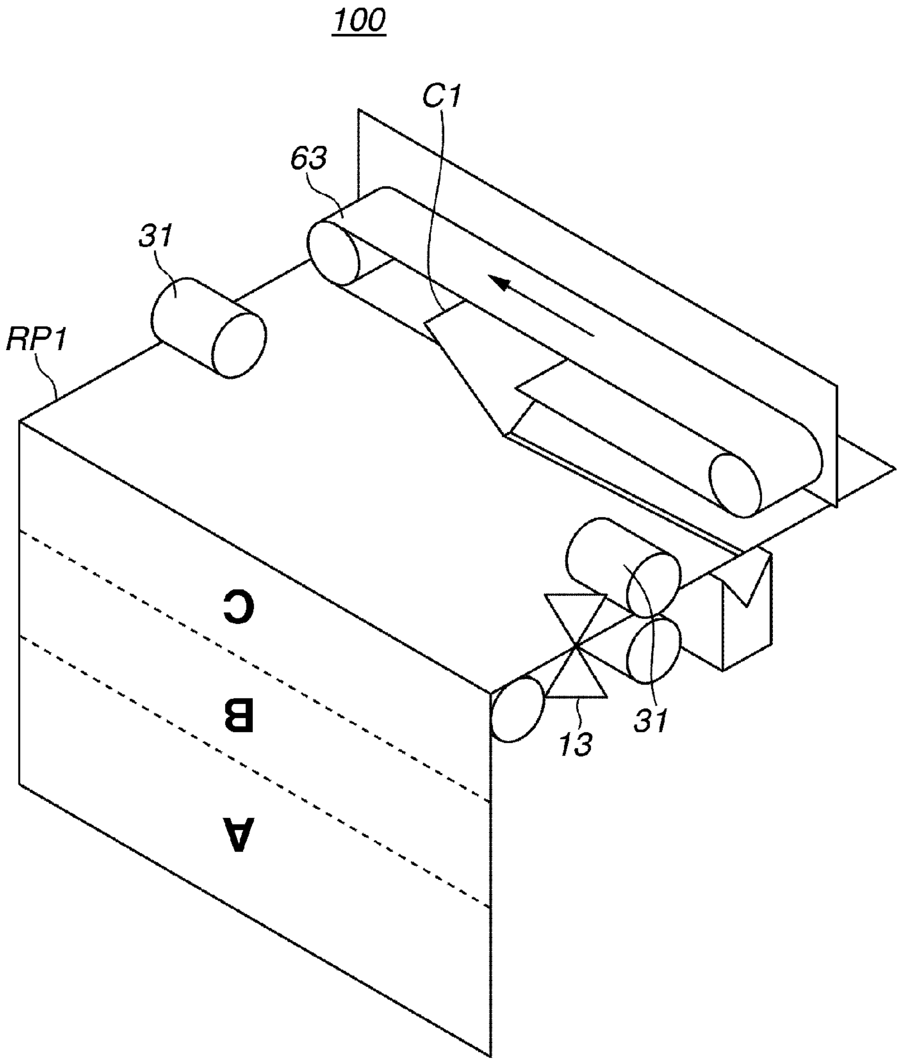
FIG. 3 is a perspective view illustrating operations of the roll paper printing apparatus according to the exemplary embodiment of the present invention.

FIG. 3 is a perspective view illustrating the operations of the roll paper printing apparatus 100.

In the roll paper printing apparatus 100, the sheet discharge sensor 13 is provided to determine whether an uncut printed output is present on the roll paper sheet discharge port. The sheet discharge sensor 13 is an infrared sensor which detects the presence of roll paper on the roll paper sheet discharge port. Although the sheet discharge sensor 13 is an infrared sensor in the first exemplary embodiment, the configuration of the sheet discharge sensor is arbitrary as long as it can detect the presence of roll paper on the roll paper sheet discharge port. For example, a microswitch can be the sheet discharge sensor.

After the roll paper printing apparatus 100 has completed printing, the sheet discharge sensor 13 detects that the roll paper is present until the printed roll paper is cut by the cutter C1.

After the roll paper is cut, the printed roll paper drops down from the sheet discharge port. Thus, the sheet discharge sensor 13 detects that a roll paper is not present until the printing start of the next job. As described above, the sheet discharge sensor 13 operates as the uncut printed output identification unit.

Next, print operation procedure of the print data 21 in the roll paper printing apparatus 100 will be described.

Figure 4:
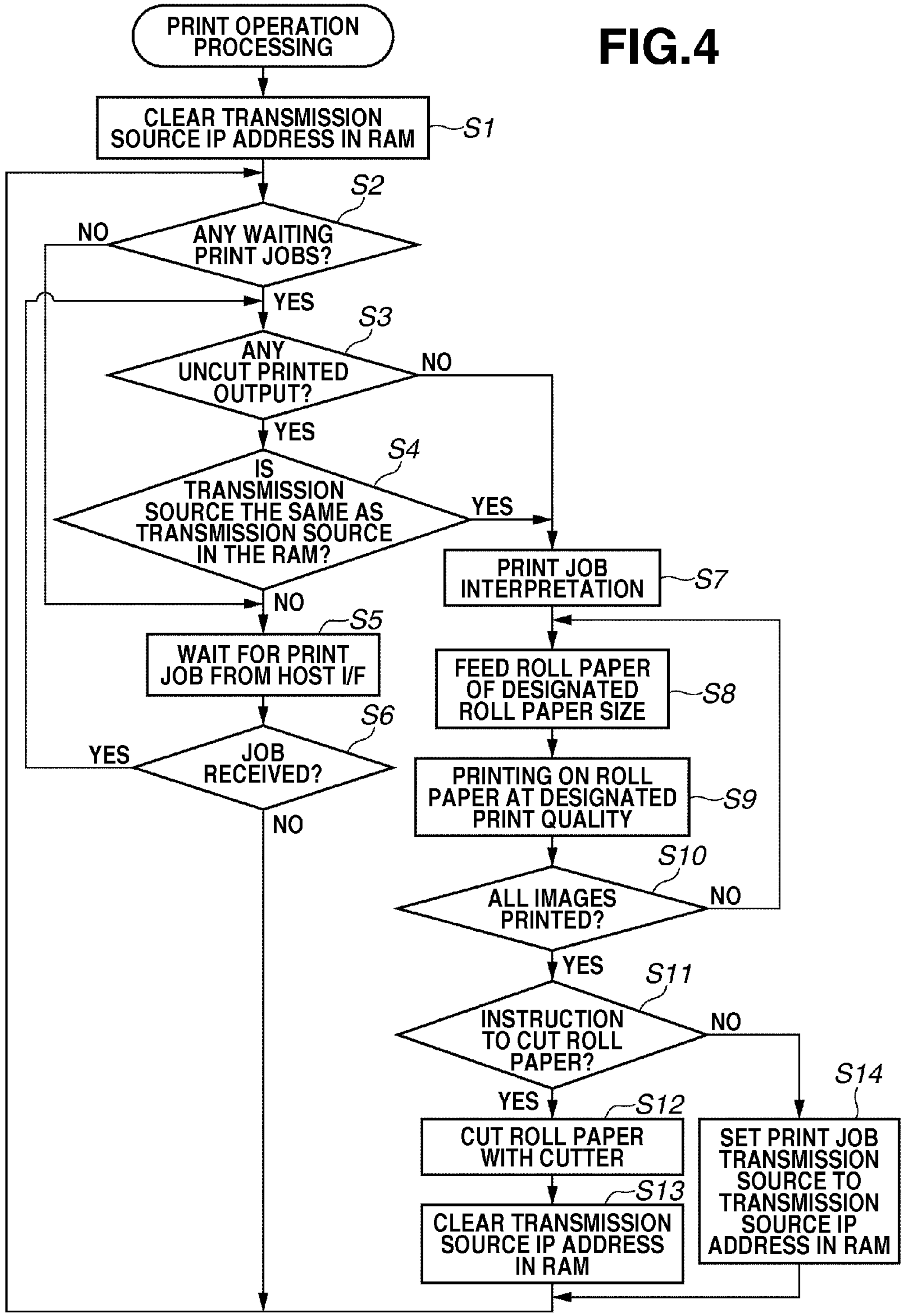
FIG. 4 is a flowchart illustrating operations for printing print data in the roll paper printing apparatus according to the exemplary embodiment of the present invention.
Figure 5:
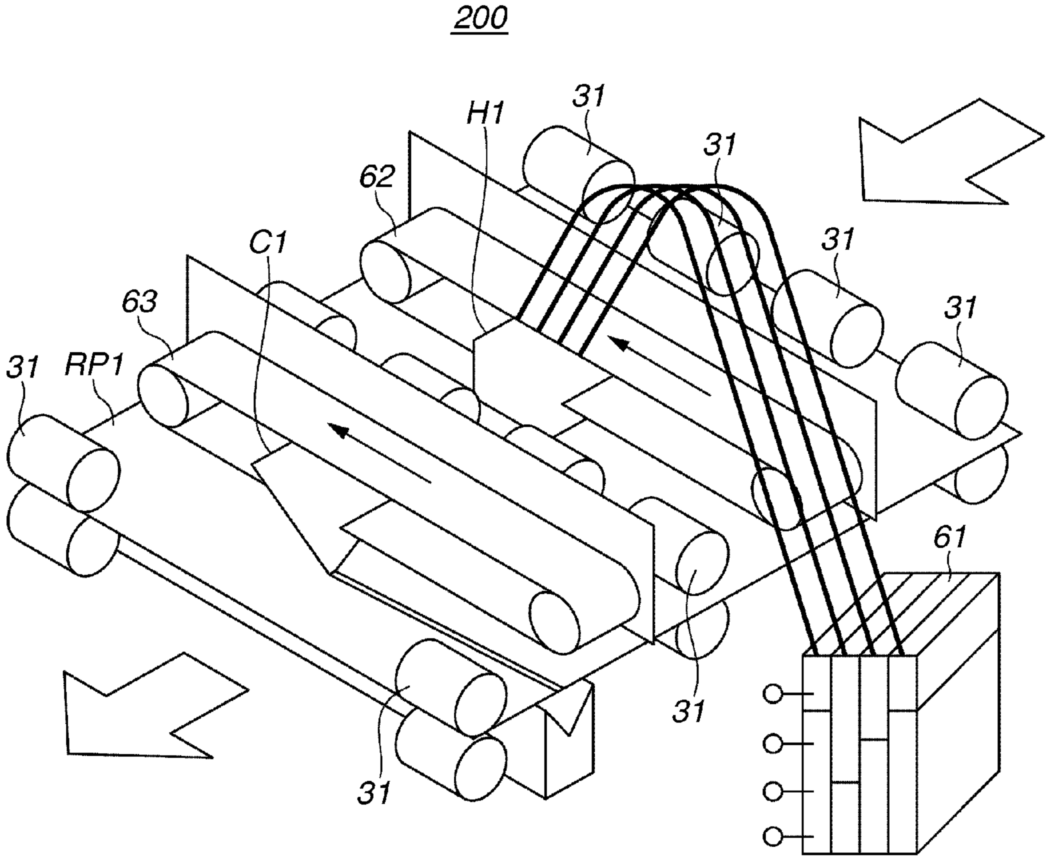
FIG.5 PRIOR ART
FIG. 5 is a diagram illustrating operations of a conventional roll paper printing apparatus.
Figure 6:
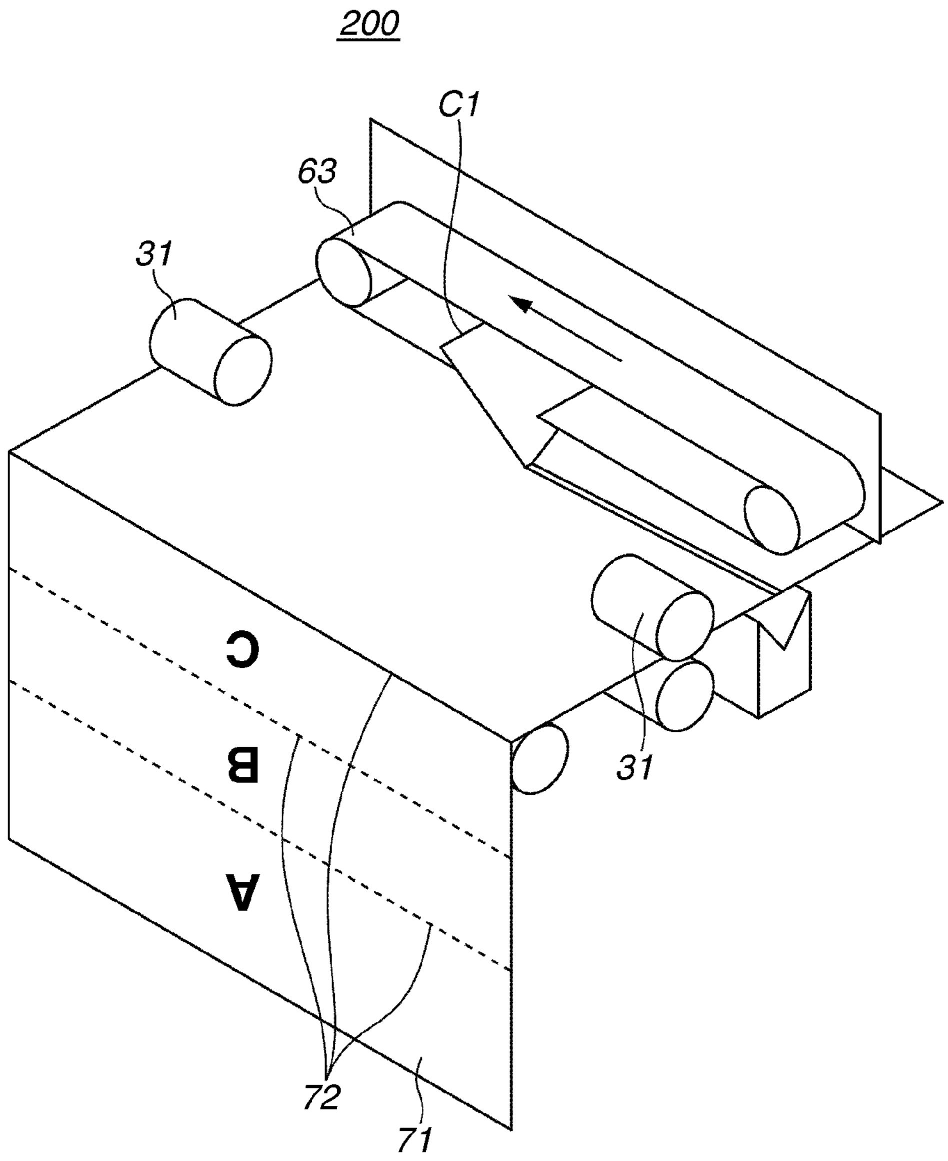
FIG.6 PRIOR ART
FIG. 6 is a diagram illustrating one sheet of consecutive print results in a conventional roll paper printing apparatus.
Figures 7A, 7B, 7C, 7D:
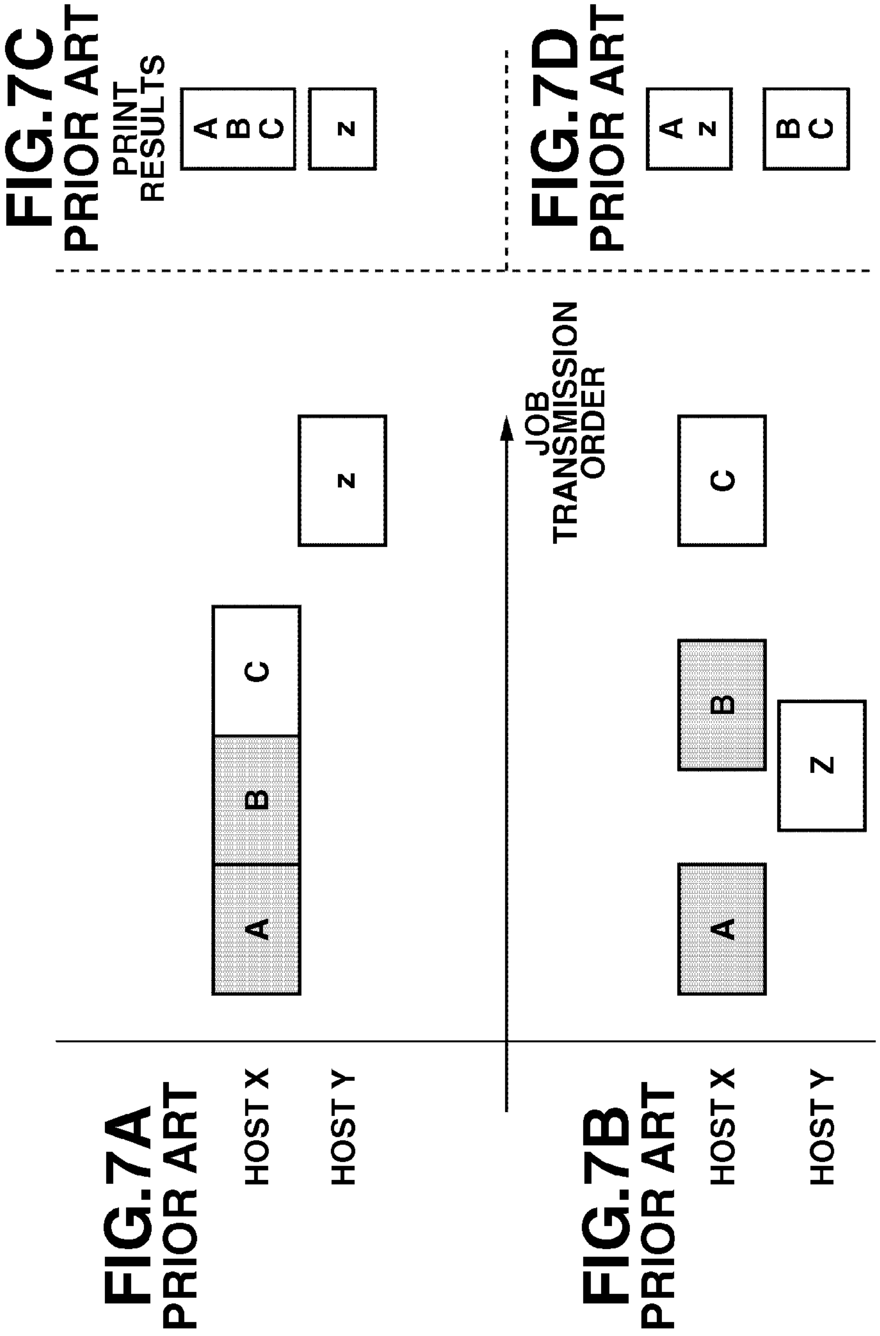
FIG.7A PRIOR ART
FIG.7B PRIOR ART
FIG.7C PRIOR ART
FIG.7D PRIOR ART
FIGS. 7A to 7D are diagrams illustrating job receiving orders transmitted from a plurality of hosts and interrupt job print results in a conventional roll paper printing apparatus.

FIG. 4 is a flowchart illustrating the operations for printing the print data 21 in the roll paper printing apparatus 100.

First, once the roll paper printing apparatus 100 is started up, in step S1, the CPU 1 clears the transmission source IP address stored in the RAM 3.

Next, in step S2, the CPU 1 confirms whether there are already any received waiting print jobs in the roll paper printing apparatus 100. If there is the waiting print job (YES in step S2), the processing proceeds to step S3, and if there is no waiting print job (NO in step S2), the processing proceeds to step S5.

In step S3, if the sheet discharge sensor 13 detects an uncut printed output (YES in step S3), the processing proceeds to step S4. If the uncut printed output is not detected (NO in step S3), the processing proceeds to step S7.

In step S4, the CPU 1 compares the transmission source IP address temporarily stored in the RAM 3 with the transmission source IP address included in the received waiting print job data. If these transmission source IP addresses are the same (YES in step S4), the processing proceeds to step S7, and if they are different (NO in step S4), the processing proceeds to step S5.

In step S5, the CPU 1 waits for a given period for a print job to be transmitted from the host via the network I/F 7.

Next, in step S6, once the print job is transmitted from the host in step S5 (YES in step S6), the processing returns to step S3, and the CPU 1 processes the transmitted print job as the received waiting print job. If the print job is not transmitted within the given period from the host (NO in step S6), the processing returns to step S2, and the processing steps are repeated.

If the uncut printed output was not detected in step S3 (NO in step S3), or the transmission source IP address included in the received waiting print job data was the same as the transmission source IP address temporarily stored in the RAM 3 in step S4 (YES in step S4), in step S7, the CPU 1 interprets the print job data. Then, in step S8, as a result of the interpretation, a roll paper conveyance unit 31 feeds and conveys the roll paper RP1 based on the obtained roll paper size information 22.

In step S9, as a result of the interpretation, the print head control unit 5 moves the print head H1 to discharge ink onto the roll paper RP1 and performs printing based on the obtained print quality information 24 and image data 26.

In step S10, the CPU 1 confirms that all of the image data 26 has been printed. Until all of the image data 26 has been printed (NO in step S10), the processing returns to step S8 and repeats the processing. Once all of the image data 26 has been printed (YES in step S10), the processing proceeds to step S11. In step S11, as the result of the interpretation, the CPU 1 confirms whether the obtained roll paper cutting instruction 23 instructs cutting of the printed matter. If the roll paper cutting instruction 23 instructs cutting of the printed matter (YES in step S11), in step S12, the cutter C1 cuts the roll paper RP1. Then, in step S13, the CPU 1 clears the transmission source IP address stored in the RAM 3, and the processing returns to step S2.

If the roll paper cutting instruction 23 does not instruct cutting of the printed matter (NO in step S11), instep S14, the CPU 1 sets the transmission source IP address obtained by the interpretation to the transmission source IP address stored in the RAM 3, and the processing returns to step S2.

Second Exemplary Embodiment

In a second exemplary embodiment of the present invention, the sheet discharge sensor 13 of the first exemplary embodiment illustrated in FIGS. 1 and 3 is deleted.

In place of the sheet discharge sensor 13 of the first exemplary embodiment, the second exemplary embodiment uses the transmission source IP address stored in the RAM 3 as the uncut printed output identification unit.

In the second exemplary embodiment, if the uncut printed output is present, the transmission source IP address stored in the RAM 3 is set, and if the uncut printed output is not present, the transmission source IP address stored in the RAM. 3 is cleared. Accordingly, by changing the print operation procedure, the transmission source IP address operates as the uncut printed output identification unit.

The print operation procedure in the second exemplary embodiment is the same as illustrated in the flowchart of FIG. 4 for the first exemplary embodiment, except for step S3.

In the second exemplary embodiment, the processing of step S3 is as follows.

In step S3, if there is the waiting print job, and if the transmission source IP address stored in the RAM 3 has been set, the processing proceeds to step S4. If the transmission source IP address has been cleared, the processing proceeds to step S7.

As described above, the second exemplary embodiment can obtain an effect similar to the first exemplary embodiment by changing the print operation procedure, even though the sheet discharge sensor 13 is deleted.

That is, according to the above exemplary embodiments, in interrupt printing in the roll paper printing apparatus, if a presence of the no-cut print matter is confirmed by the uncut printed output identification unit, the interrupt printing is prohibited except for that from the host which transmitted the no-cut print job, by using an interrupt print prohibition unit. As a result, a user can obtain a correct banner print result even if a transmission interval between the no-cut print jobs is widened.

The exemplary embodiments can be understood as a method invention. More specifically, the exemplary embodiments are an example of a method for controlling a roll paper printing apparatus which includes a host interface unit, a roll paper printing unit, a roll paper cutting unit, and a roll paper cutting instruction determination unit which controls the roll paper cutting unit based on roll paper cutting instruction included in print data received from the host interface unit.

The method includes identifying a transmission source of the print data received from the host interface unit, storing the identified transmission source information in a storage apparatus, comparing the transmission source information of a previously printed print job stored in the storage apparatus with the transmission source information of a print job which is to be printed next, identifying an uncut printed output, and when the uncut printed output is identified, prohibiting the printing of the print job which is to be printed next as interrupt printing if the transmission source information of the preceding print job and the transmission source information of the print job which is to be printed next are different to each other.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A print control apparatus for causing a printer to print an image on a continuous sheet, the apparatus comprising:

an accepting unit configured to accept a print job sent from a sender for printing the image on the continuous sheet; and a control unit configured to control a printing order for causing the printer to print the image based on a plurality of print jobs accepted by the accepting unit, in a case where the accepted print job whose printing is started by the printer and which is sent from a first sender is not for cutting the continuous sheet, such that the printing for another print job sent from a second sender different from the first sender of the started print job is restrained until a subsequent print job sent from the first sender for cutting the continuous sheet is accepted by the accepting unit and the printing for the subsequent print job is performed by the printer.

2. The apparatus according to claim 1, further comprising a determining unit configured to determine whether the print job accepted by the accepting unit is for cutting the continuous sheet or not based on information contained in the print job.

3. The apparatus according to claim 1, further comprising a specifying unit configured to specify a sender who sent the print job accepted by the accepting unit based on information contained in the print job.

4. The apparatus according to claim 1, wherein the control unit causes the printer to print the image based on a plurality of print jobs sent from a same sender sequentially for obtaining one sheet of consecutive print result.

5. The apparatus according to claim 1, wherein the control unit holds the another print job sent from the second sender and accepted by the accepting unit until the subsequent print job sent from the first sender for cutting the continuous sheet is accepted by the accepting unit and the printing for the subsequent print job is performed by the printer.

6. A print control method for causing a printer to print an image on a continuous sheet, the method comprising:

accepting a print job sent from a sender for printing the image on the continuous sheet; and restraining, in a case where the accepted print job whose printing is started by the printer and which is sent from a first sender is not for cutting the continuous sheet, the printing for another print job sent from a second sender different from the first sender of the started print job until a subsequent print job sent from the first sender for cutting the continuous sheet is accepted and the printing for the subsequent print job is performed by the printer.

7. A non-transitory computer readable medium containing a program which executes each step recited in claim 6 by a computer.

* * * * *